(12) United States Patent
Mathur et al.

(10) Patent No.: US 8,499,352 B2
(45) Date of Patent: *Jul. 30, 2013

(54) OBFUSCATED MALWARE DETECTION

(75) Inventors: Rachit Mathur, Hillsboro, OR (US);
Cedric Cochin, Portland, OR (US)

(73) Assignee: McAfee, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/440,595

(22) Filed: Apr. 5, 2012

(65) Prior Publication Data

US 2012/0198554 A1     Aug. 2, 2012

Related U.S. Application Data

(63) Continuation of application No. 12/639,465, filed on Dec. 16, 2009, now Pat. No. 8,176,559.

(51) Int. Cl.
*G06F 11/28* (2006.01)
*G06F 11/30* (2006.01)
*G08B 23/00* (2006.01)
*G06F 12/14* (2006.01)

(52) U.S. Cl.
USPC .............................. 726/24; 726/23; 713/188

(58) Field of Classification Search
USPC ...................................... 726/23, 24; 713/188
See application file for complete search history.

(56) References Cited

U.S. PATENT DOCUMENTS

| | | | |
|---|---|---|---|
| 7,624,449 B1 | 11/2009 | Perriot | |
| 7,640,583 B1 | 12/2009 | Marinescu et al. | |
| 2004/0133777 A1* | 7/2004 | Kiriansky et al. | 713/166 |
| 2005/0028002 A1 | 2/2005 | Christodorescu et al. | |
| 2005/0198645 A1* | 9/2005 | Marr et al. | 719/310 |
| 2006/0101047 A1 | 5/2006 | Rice | |
| 2007/0234070 A1 | 10/2007 | Horning et al. | |
| 2008/0016339 A1 | 1/2008 | Shukla | |
| 2008/0127114 A1 | 5/2008 | Vasudevan | |

FOREIGN PATENT DOCUMENTS

| | | |
|---|---|---|
| WO | WO2009014779 A3 | 1/2009 |
| WO | WO 2011/084614 | 7/2011 |

OTHER PUBLICATIONS

Sidiroglou, Stelios et al. "Building a Reactive Immune System for Software Services", 2005.*
Notification Concerning Transmittal of International Preliminary Report on Patentability and Written Opinion, PCT/US2010/060798 mailed Jun. 28, 2012 (5 pages).

(Continued)

*Primary Examiner* — Michael Simitoski
(74) *Attorney, Agent, or Firm* — Patent Capital Group

(57) ABSTRACT

Methods, systems, and apparatus, including computer programs encoded on a computer storage medium, for detecting obfuscated malware. In one aspect, a method includes identifying call instructions in a binary executable; executing the call instruction; executing instructions subsequent to a target of the call instruction; determining that an address identified by a stack pointer is different from the return address; in response to the determination that the address is different, determining if there is a non-obfuscation signal; if there is a non-obfuscation signal, identifying the call instruction as a non-obfuscated call instruction; if there is not a non-obfuscation signal, identifying the call instruction as a possibly obfuscated call instruction; determining whether the call instructions identified as possibly obfuscated call instructions exceeds a threshold; in response to the determination that the call instructions identified as possibly obfuscated call instructions exceeds the threshold, identifying the executable as an obfuscated executable.

20 Claims, 4 Drawing Sheets

OTHER PUBLICATIONS

Notification of Transmittal of the International Search Report and the Written Opinion of the International Searching Authority, or the Declaration, Sep. 19, 2011.

Bruschi, Danilo et al., "Static Analysis on x86 Executables for Preventing Automatic Mimicry Attacks," 2007.

Christodorescu, Mihai and Somesh Jha. "Static Analysis of Executables to Detect Malicious Patterns," 2003.

Cowan, Crispin et al. "StackGuard: Automatic Adaptive Detection and Prevention of Buffer-Overflow Attacks," 1998.

Feng, Henry Hanping et al. "Anomaly Detection Using Call Stack Information," 2003.

Kruegel, Christopher and Engin Kirda. "Automating mimicry attacks using static binary analysis," 2005.

Lakhotia, Arun and Uday Eric. "Stack Shape Analysis to Detect Obfuscated calls in Binaries," 2004.

Sekar, R. et al. "A Fast Automaton-Based Method for Detecting Anomalous Program Behaviors," 2001 IEEE.

Venable, Michael et al. "Analyzing Memory Accesses in Obfuscated x86 Executables," 2005.

Wagner, David and Drew Dean, "Intrusion Detection via Static Analysis," 2001.

* cited by examiner

OBFUSCATED MALWARE DETECTION

CROSS REFERENCE TO RELATED APPLICATIONS

This application is a continuation of U.S. application Ser. No. 12/639,465, titled "Obfuscated Malware Detection," filed Dec. 16, 2009, now issued as U.S. Pat. No. 8,176,559, the disclosure of which is incorporated herein by reference in its entirety.

BACKGROUND

This application relates to malware protection programs.

Malware authors and malware protection program authors are constantly engaging in a game of cat and mouse. The malware protection program authors attempt to write malware protection programs that identify and eliminate the threats posed by malware programs, and the malware authors attempts to generate malware programs that avoid detection. Malware protection programs employ numerous methods for detecting known malware. For example, malware protection programs can detect known malware programs based on the signature associated with the program, or they can analyze the properties of the malware program and identify it based on certain characteristics of the source code.

Malware authors use various methods of obfuscating malicious code. Obfuscating malware code makes it more difficult for malware protection programs to detect the malware code because the harmful properties of the malware code cannot be detected in the obfuscated code. For example, one common malware obfuscation technique is known as Control Flow Graph obfuscation. Control Flow Graph obfuscation is a technique that modifies the control of the malware program (i.e., the malware program) by strategically inserting "jump" instructions into the code, or manipulating "call" instructions in the code. However, the malware programs remain harmful to a system.

SUMMARY

In general, one innovative aspect of the subject matter described in this specification can be embodied in methods that include the actions of identifying a number of call instructions in a binary executable; for each of the number of call instructions: storing in a call stack a default value generated for the call instruction; executing the call instruction, wherein executing the call instruction causes a return address after the call instruction to be stored in the call stack; sequentially executing a plurality of instructions subsequent to a target of the call instruction; determining that a value identified by a stack pointer of the call stack is equal to the default value; in response to the determination that the value identified by the stack pointer is equal to the default value, determining if there is a non-obfuscation signal present; if there is a non-obfuscation signal present, identifying the call instruction as a non-obfuscated call instruction; if there is not a non-obfuscation signal present, identifying the call instruction as a possibly obfuscated call instruction; determining whether the call instructions identified as possibly obfuscated call instructions exceeds a threshold number; in response to the determination that the call instructions identified as possibly obfuscated call instructions exceeds the threshold number, identifying the binary executable as an obfuscated executable; and in response to the determination that the call instructions identified as possibly obfuscated call instructions do not exceed the threshold number, identifying the binary executable as a non-obfuscated executable. Other embodiments of this aspect include corresponding systems, apparatus, and computer programs, configured to perform the actions of the methods, encoded on computer storage devices.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
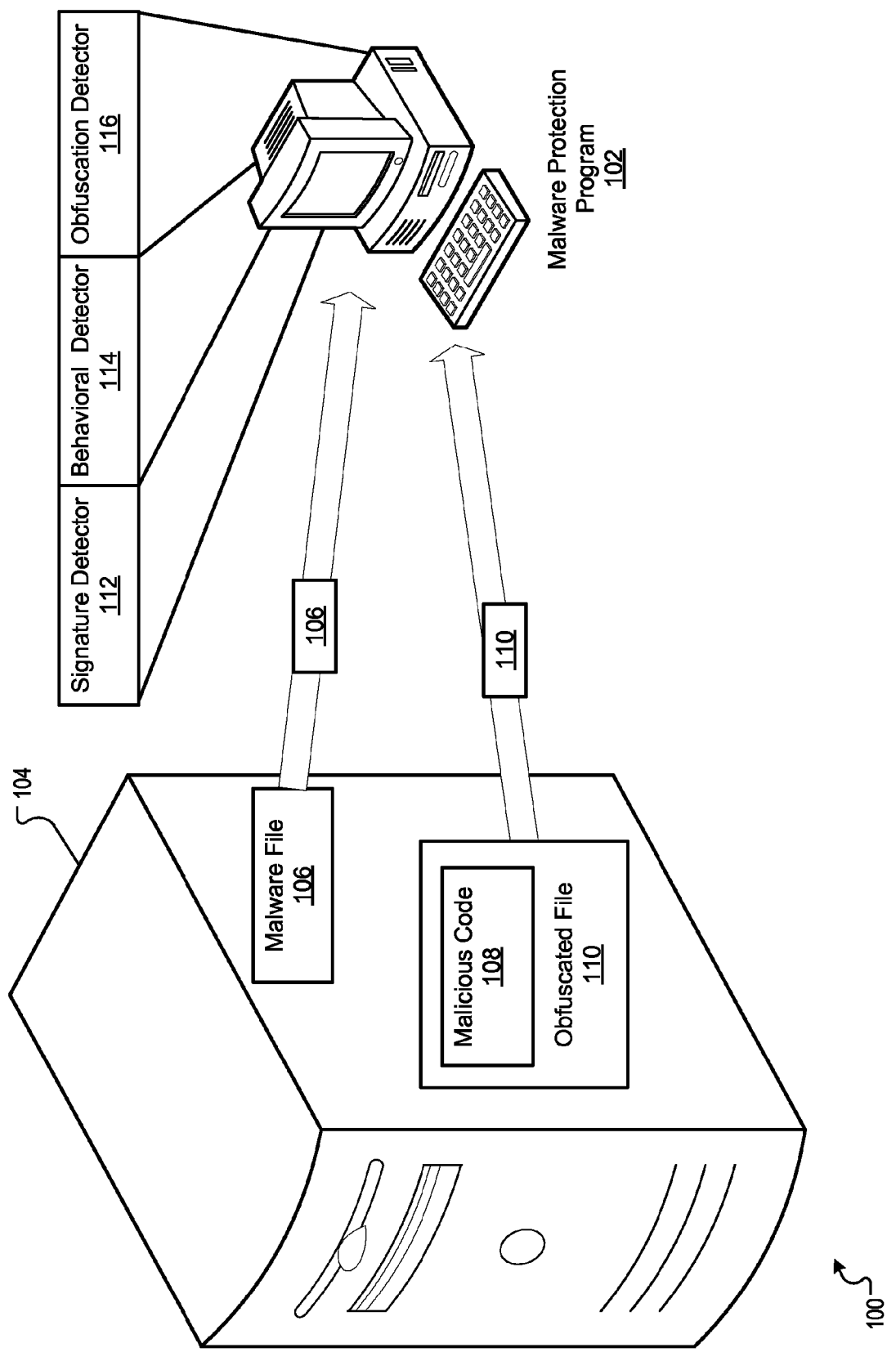
FIG. 1 is a diagram of an example malware protection program.

FIG. 1 is a diagram 100 of an example malware protection program 102. The malware protection program 102 includes a signature detector 112, behavioral detector 114, and obfuscation detector 116. Although pictured as separate components in the diagram 100, the signature detector 112, the behavioral detector 114, and the obfuscation detector 116 can be combined into a single component or they can be further subdivided into multiple components.

The malware protection program 102 scans files on a computer 104 to identify malware programs. In some implementations, the malware protection program 102 resides on the computer 104, and scans for malware locally. In other implementations, the malware protection program 102 resides on a remote server, and scans for malware remotely.

The malware protection program 102 protects the computer 104 by identifying, assessing, quarantining, and remediating malicious files that reside on the computer 104. The malware protection program 102 can identify malware programs using different methods. In some implementations, the malware protection program 102 utilizes a signature detector 112 to identify malware. The signature detector 112 can use malware definitions that identify, by file signature (e.g., a filename, a hash function for a file), files that are known to be malicious files. The signature detector 112 can search for a file signature on the computer 104 that matches the signature in the malware definitions. For example, the signature detector 112 can identify the file "virus.exe" as a malware program because the malware definitions indicate that the signature of "virus.exe" matches the signature of a file that is known to be malicious.

In some implementations, the malware protection program 102 utilizes a behavioral detector 114 to identify malware. The behavioral detector 114 can search for patterns of behavior that resemble malware programs. For example, the behavioral detector 114 can identify any file that has sequences of instructions to access the file "library.exe" because "library.exe" is a DLL from an internet browsing software that is known to be exploited by malware. Thus, the behavioral detector 114 can identify "virus.exe" as malware if "virus.exe" includes multiple sequences of instructions that access "library.exe."

Other methods of detecting malware programs can also be used by the malware protection program 102. One such method is detection by obfuscation, which is described in more detail below with reference to the obfuscation detector 116. Thus, the malware protection program 102 can identify a malware file 106 that resides on the computer 104 by processing the malware file with one of the detection engines on the malware protection program 102 (e.g., the signature detector 112, the behavioral detector 114).

§1.0 Effect of Obfuscated Code

If the malware author obfuscates the malicious code 108 in an obfuscated file 110, then the malware protection program 102 may not be able to detect that the obfuscated file 110 is a malware program. For example, the obfuscated file 110 may have the same type of malicious code 108 as the malware file 106, but the malicious code 108 is obfuscated in a way to avoid detection by the malware protection program 102. For example, the obfuscated file 110 may have a different sequence of instructions so the behavioral detector 114 is not able to detect the malicious code 108 in the obfuscated file 110. Additionally, the modified sequence of instructions may result in a modified signature, so the signature detector 112 is not able to detect the file as known malware. However, the malware protection program 102 can use the obfuscation detector 116 to identify the code obfuscation. Thus, the malware protection program 102 may not recognize the malicious code 108 within the obfuscated file 110, but the malware protection program 102 can identify a malware program based on the presence of obfuscated code.

§1.1 Obfuscated Code

Figure 2:
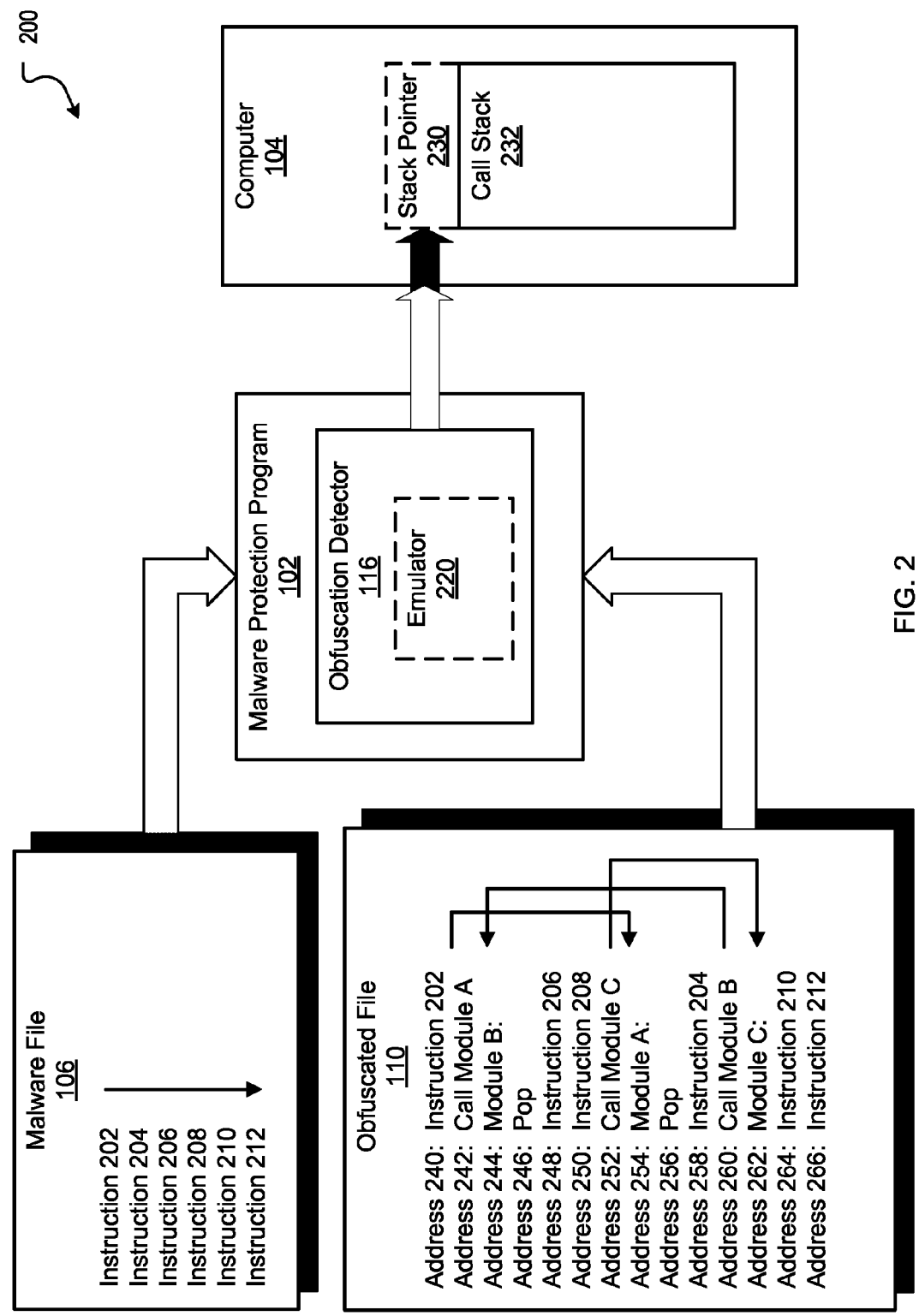
FIG. 2 is a diagram of an example code obfuscation.

FIG. 2 is a diagram 200 of an example code obfuscation. The obfuscated file 110 in the diagram 200 includes the same instructions as the non-obfuscated malware file 116, but the obfuscated file 110 cannot be detected in the same manner as the malware protection program 102 detects the malware file 116. In FIG. 2, the first instruction at the target of a call has been replaced with a module label (e.g., "Module A" at Address 254, "Module B" at Address 244). In some implementations, a module label does not occupy an address in a compiled executable, and thus, the first instruction of a called module (e.g., "pop" at address 246 of Module B) is at the target of the call rather than the module label. However, FIG. 2 includes the label at the first instruction at the target of a call for ease of reference.

In normal execution of a program, a call stack 232 maintains information about active modules, including the return address for when the module is finished executing, such as when the module is executed in response to a call instruction. A stack pointer 230 references the most recent item in the call stack 232. Thus, if a call instruction to a module is executed, the program adds a return address to the call stack 232, and the stack pointer 230 points to the recently added return address. In some implementations, the return address is the address after the call instruction, or the address of the next instruction in program memory following the call instruction. At the end of the execution of the module, the program retrieves the return address by accessing the stack pointer 230, and the program returns control to the return address.

Some implementations of code obfuscation in malware programs utilize a call instruction to direct control of a program to a module, and then remove the return address from the call stack 232 so that control of the program does not return to the return address. Instead, the malware programs can direct control to another instruction at another location. In this manner, malware programs can use a sequence of call instructions combined with forced removals of the return address from the call stack 232 to obfuscate malicious code.

As a result, the malicious code cannot be detected by the malware protection program 102 because the control of the malware program is difficult to predict or follow.

For example, the malware file 106 is an example of a malware program. The instructions in the malware file 106 (e.g., instructions 202, 204, 206, 208, 210 and 212), when executed in that order, are malicious code that is harmful to a computer, and can be detected by the malware protection program 102.

The obfuscated file 110 is an example of obfuscated malicious code. When executing the obfuscated file 110, the instruction 202 is first executed. The program then calls module A (address 242), and adds the return address (address 244) to the call stack 232. At module A, the program immediately executes a pop (address 256), removing the return address from the call stack 232. The next instruction executed is instruction 204 (address 258). The program calls module B (address 260), adds a return address (address 262) to the call stack 232, and then at module B immediately executes a pop instruction (address 246), removing the return address from the call stack 232. The program executes instructions 206 and 208 (addresses 248 and 250), and then calls module C, where the program executes instructions 210 and 212 (addresses 264 and 266). Thus, the obfuscated file 110 contains the same malicious code executed in the same order (e.g., instructions 202, 204, 206, 208, 210 and 212) as in the malware file 106, but the code is obfuscated through the use of call instructions and pop instructions.

In some implementations, malware programs can use instructions equivalent to "pop" instructions to obfuscate code. For example, malware programs can use "add esp,4", or a "sub esp,1" followed by "add esp,5." These instructions operate similar to "pop" instructions in that they modify stack instructions.

Accordingly, an indication of code obfuscation is utilizing call instructions and manipulations of the call stack 232 to obfuscate malicious code. By use of the obfuscation detector 116, the malware protection program 102 can determine whether a file includes obfuscated code by monitoring the call stack 232. An emulator 220 can emulate call instructions from a file and monitor the effect of the emulation on the call stack 232 by keeping track of the stack pointer 230. For any given file, if a threshold number of calls from the file manipulate the stack pointer 230, the obfuscation detector 116 can identify the file as an obfuscated file.

§1.1 Identifying Obfuscations of Code

Figure 3:
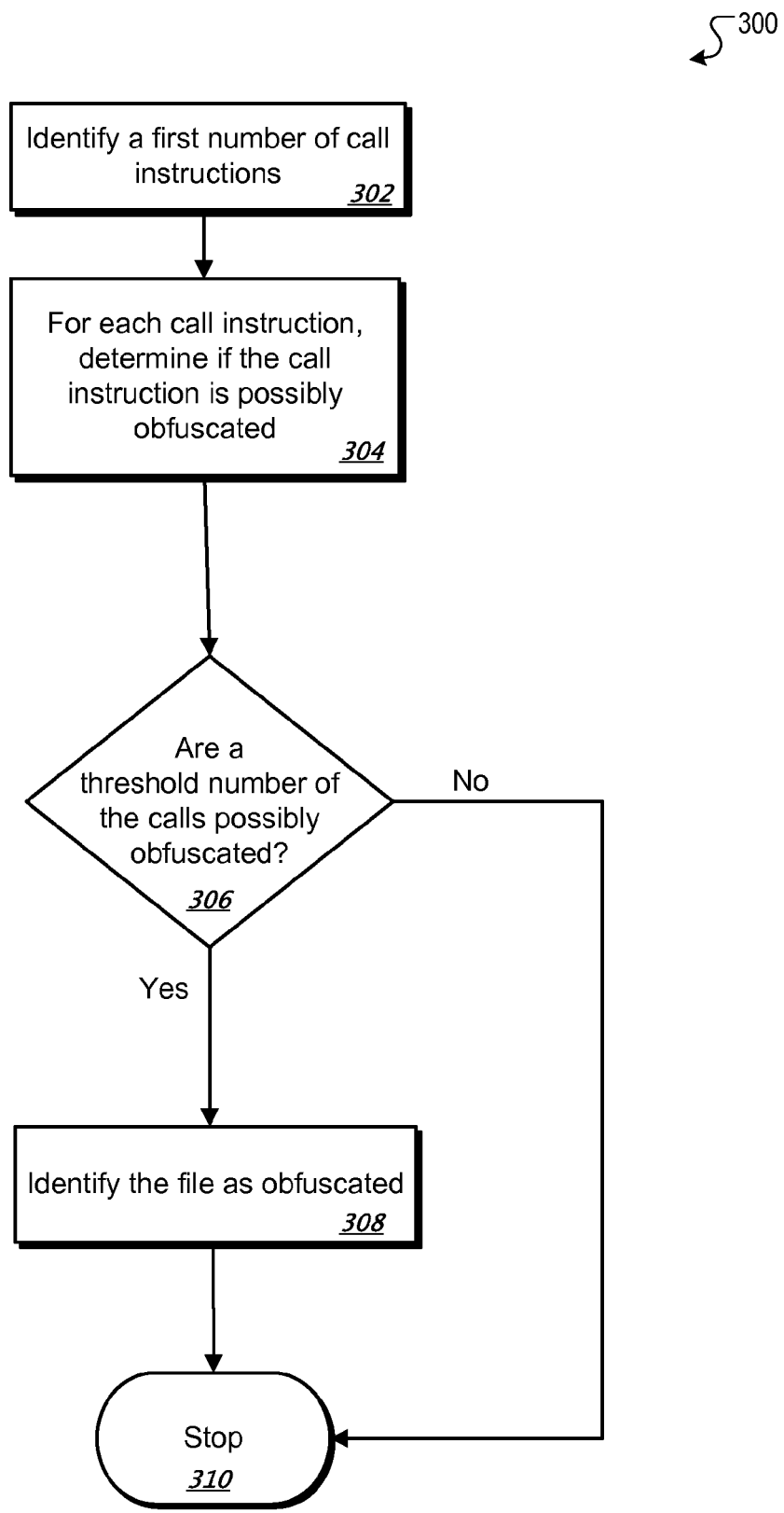
FIG. 3 is a flow diagram of an example obfuscation detection process.

FIG. 3 is a flow diagram of an example obfuscation detection process 300. In some implementations, the process 300 can be implemented by the obfuscation detector 116 and the emulator 220.

In some implementations, the process 300 requires that the obfuscation detector 116 selects a number of call instructions to emulate, and then monitor the effect of the emulation of the selected calls on the call stack 232 and stack pointer 230. The obfuscation detector 116 adds a default value to the call stack 230, and then emulates each call instruction and the instructions at the target of the call. If the emulated call instruction results in a modification to the stack pointer 232 and additional signals are present that are indicative of possible obfuscation (i.e., "obfuscation signals") then the obfuscation detector 116 determines that the call instruction is possibly obfuscated. Such additional signals can include, for example, modification of the call stack pointer after the call instruction is executed and before a return from the called function is executed. Alternatively, if the emulated call instruction results in a modification to the stack pointer 232 and additional signals are present that are indicative non-obfuscation (i.e., "non-obfuscation signals"), then the detector 116 determines that the call instruction is not obfuscated. Such additional signals can include, for example, a failure of the call instruction to execute, or the execution of a return from the call.

There may be some situations in which non-malicious software may modify the stack pointer 232 in a way that causes an obfuscation signal to be present. Accordingly, in some implementations, the existence of any one call instruction that results in such a modification does not automatically result in the code being identified as malware. Instead, if more than a threshold number of call instructions from a file are considered possibly obfuscated, then the file is considered an obfuscated file.

Stage 302 identifies a first number of call instructions to emulate. The obfuscation detector 116 determines the number of call instructions to emulate from the program based upon different factors and considerations. In some implementations, the size of the program can be used to determine the appropriate number of call instructions to emulate. For example, in a larger file, more call instructions may need to be emulated than in a smaller file. In some implementations, the number of call instructions to emulate can be based on a statistical analysis of the number of call instructions that are needed to comprise a sample set for testing a file for obfuscated code. For example, the statistical analysis may show that at least ten call instructions must be analyzed to properly identify an obfuscated file, so the emulator may choose to emulate the first ten call instructions.

Additionally, the obfuscation detector 116 may select only call instructions for emulation so that the selected call instructions are unique with respect to each other. A call instruction is considered a unique call instruction with respect to other call instructions if the call instruction references a target call instruction that is not referenced by the other target call instructions. The obfuscation detector 116 can ensure that a call instruction is unique by identifying the call instruction based on the target of the call instruction, and not the address of the call instruction. For example, there may be multiple call instructions in a program to Module M. However, the obfuscated detector 116 will only select to emulate the first call instruction to the Module M at Address A.

Stage 304 determines for each call instruction if that call instruction is possibly obfuscated. An example process for determining whether a call instruction is an obfuscated call is described with reference to FIG. 4.

Stage 306 determines if a threshold number of the emulated calls were considered possibly obfuscated calls by the obfuscation detector 116. The obfuscation detector 116 emulates a predetermined number of calls and determines for each call whether the call is possibly obfuscated, as discussed for example in the aforementioned stages 302 and 304. After the emulator 220 has emulated all the selected calls, the obfuscation detector 116 determines if more than a threshold number of the emulated calls were possibly obfuscated. The threshold number can be determined by the obfuscation detector 116 based on a statistical analysis of obfuscated files, or the threshold number can be provided to the obfuscation detector 116. For example, the obfuscation detector 116 may have been provided a threshold number of five, meaning that if the emulator 220 emulated five or more calls that were considered possibly obfuscated, the threshold number of calls was considered possibly obfuscated.

If stage 306 determines that a substantial number of the emulated calls from the program were identified as possibly obfuscated, then stage 308 identifies the file as an obfuscated file. Otherwise, the program is not identified as an obfuscated file. For example, if five of the emulated calls from "example.exe" are considered possibly obfuscated, then "example.exe" is a possibly obfuscated file, and is treated as a malware file.

Figure 4:
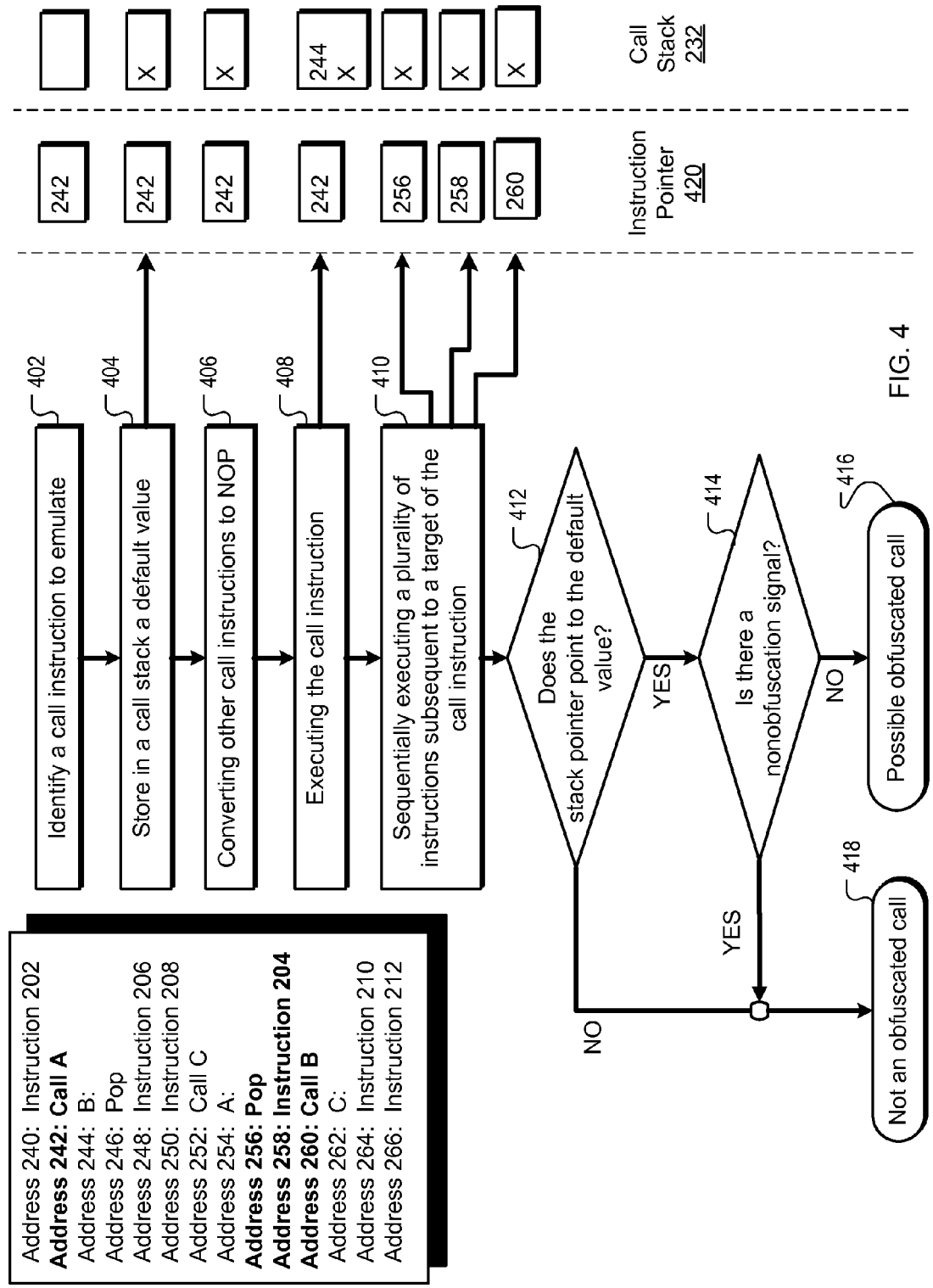
FIG. 4 is a flow diagram of an example malware detection process.

FIG. 4 is a flow diagram of an example malware detection process 400. The process 400 can, for example, be implemented by the obfuscation detector 116 of FIG. 1, and described in FIG. 2, and can be used to implement stage 304 of FIG. 3. The process 400 is described in the context of an example series of instructions that are emulated, and the resulting values an instruction pointer 420 references and the resulting values stored in a call stack 232.

Stage 402 identifies a call instruction to emulate. In some implementations, the obfuscation detector 116 identifies a predetermined number of call instructions to emulate, and emulates each call instruction separately. For example, the obfuscation detector 116 can identify three unique call instructions to emulate from the binary executable "obfuscated.exe," including a call instruction to module A (at address 242). At this stage, the instruction pointer 420 points to the current instruction to execute at address 242.

Stage 404 stores in a call stack 232 a default value. For example, the obfuscation detector 116 of the FIG. 1 can use the "mov" instruction to add the default value "X" to the call stack 232. Thus, the stack pointer 230 identifies X as the return address. At this stage, the instruction pointer 420 points to the current instruction to execute at address 242.

Stage 406 converts the other call instructions in the binary executable to "nop." For example, if the obfuscation detector 116 selects to emulate the call instruction to module A, the obfuscation detector 116 converts all call instructions except the call to Module A to "nop" (e.g., Call Module B at address 260, Call Module C at address 252). Converting the remaining call instructions to "nop" allows the obfuscation detector 116 to maintain the control of emulated call instruction because the obfuscation detector 116 does not have to account for execution of other call instructions subsequent to the target of the emulated call instruction. The conversion does not change the instruction pointer 420, and thus, at this stage, the instruction pointer 420 points to the current instruction to execute at address 242.

In some implementations, the obfuscation detector 116 converts to "nop" only the remaining call instructions within a predetermined range of the target of the emulated call instruction. The predetermined range is a byte range that can be a considered a control range, because it allows the emulator 220 to exert control over the operations within that byte range. In some implementations, if the emulation transfers control outside of the control range, the emulation stops because the emulator 220 does not have control of the emulation outside the control range.

Stage 408 executes the call instruction. For example, the emulator 220 can execute the selected call instruction at address 242 that calls Module A. Emulation of the call instruction adds the return address 244 to the call stack 232, so the stack pointer 230 points to the return address 244. Thus, after Module A finishes executing, it will return control to the address 244. At this stage, the instruction pointer 420 points to the current instruction to execute at address 242.

Stage 410 sequentially executes a plurality of instructions at the target of the call instruction. In some implementations, the number of instructions that are emulated is predetermined As used herein, "sequential execution of the plurality of instructions" is the execution of the predetermined number of instructions in the order that they are loaded into memory, unless the execution encounters a return instruction or if the predetermined number of instructions is reached, in which case the emulation stops. The obfuscation detector 116 can select the predetermined number of instructions based, for example, on a statistical analysis of the number of instructions that need to be emulated to accurately analyze a call instruction.

For example, the emulator 220 can execute three instructions at Module A. In other implementations, more instructions can be executed, e.g., six instructions. The first instruction is the pop instruction (address 256). Execution of address 256 causes the value referenced by the stack pointer 230 (return address 244) to pop from the call stack 232. The stack pointer 230 points to the next value in the call stack 232, which is the default value "X." The emulator 220 executes the next two instructions, which are the instruction 204 at the address 260, and a "nop" instruction that replaced the call instruction to module B at address 260. During the emulation, the instruction pointer 420 identifies each instruction prior to the emulation of that instruction. Thus, prior to the emulation of the pop instruction (at address 256), the instruction pointer 420 points to address 256. Similarly, prior to the emulation of instruction 205 (at address 258), the instruction pointer 420 points to address 258. Prior to the emulation of the "nop" instruction in place of the call to B, the instruction pointer 420 points to the address 260.

Stage 412 determines whether the stack pointer points to the default value. For example, the emulation of Module A added a return address to the stack pointer, but then subsequently popped the return address as well (e.g., pop instruction at address 256). Thus, the obfuscation detector 116 determines that the value identified by the stack pointer 230 is "X," which is the default value that was added to the call stack 232 prior to emulation. At this stage, the instruction pointer 420 still points to the address 260.

If stage 412 determines that the value stored in the stack pointer is not equal to the default value added to the stack pointer, then stage 418 does not identify the call as a possibly obfuscated call. For example, a predetermined number of instructions may have been executed without a return being executed and without a manipulation of the call stack 232. This condition is indicative of a control flow that is not designed with the intent to obfuscate code.

In the example of FIG. 4, however, stage 412 does determine that the value identified by the stack pointer 230 is equal to the default value added to the stack pointer. If stage 412 determines that the value identified by the stack pointer 230 is equal to the default value, then stage 414 determines if there is a non-obfuscation signal present. As described above, a non-obfuscation signal can indicate the execution of instructions that are not obfuscated, but that still result in the stack pointer 230 identifying the default value. For example, a non-obfuscation signal can exist where the emulated call does not execute, because if the emulated call does not execute, a return address is not pushed onto the call stack 232. Additionally, a non-obfuscation signal can exist where the emulated call executes, and the plurality of instructions subsequent to the target execute, including a return instruction, which causes the return address to be popped from the call stack 232.

In some implementations, the determination of whether there is a non-obfuscation signal is a two step process that involves comparing a current value referenced by the instruction pointer 420 to the address of the call instruction. First, the obfuscation detector 116 determines if the instruction pointer 420 still points to the call instruction to emulate. For example, if the target of the call instruction was an external file, or if the call instruction was defective or buggy, the call instruction may not execute during emulation. The failed emulation of a defective call would not add a return address to the call stack 230, and thus, the stack pointer 230 still points to the default value because the call instruction did not execute properly, and not because the emulated call modified the call stack 232. In the example shown in FIG. 4, however, after the emulation (at stage 414) the instruction pointer 420 points to address 260, which is different from the call instruction (address 242). Thus, the obfuscation detector 116 determines that the emulated call instruction (address 242) did execute.

In the case of the call stack not including the default value and the instruction pointer not referencing the address of the call instruction, then it is likely that the call is not obfuscated if a return did execute. Accordingly, the obfuscation detector 116 next determines if the instruction pointer 420 points to the next instruction after the emulated call instruction (e.g., instruction address 244). The instruction pointer 420 pointing to the next instruction indicates that a return instruction for the call executed, and control returned to the instruction after the call instruction. For example, if the emulator 220 executes the return instructions at the target of a non-obfuscated call instruction, the emulated return will obtain a return address from the stack pointer 230, and remove the return address from the call stack 232. In the example shown in FIG. 4, however, the instruction pointer 420 points to address 260. This is different from the next instruction after the call address (i.e., address 244). Thus, the obfuscation detector 116 determines that there is an obfuscation signal present (or, alternatively, a non-obfuscation signal is not present).

If stage 412 determines that the stack pointer points to the default value, and stage 414 determines that there is not a non-obfuscation signal present (or determine that an obfuscation signal is present), then stage 416 identifies the call as a possibly obfuscated call. For example, because the stack pointer 230 points to the default value of "X," but the instruction pointer does not point to the instruction of call A (242) or the next instruction (244), the obfuscation detector 116 determines that the emulated call modified the call stack 232 in a manner consistent with code obfuscation techniques.

If stage 414 determines that there is a non-obfuscation signal present, stage 418 identifies the call instruction as a non-obfuscated call instruction. For example, if the obfuscation detector 116 determined that the value stored in the stack pointer 230 is not "X," or that a call never executed, or that all instructions in the call executed, including the return then the obfuscation detector 116 would not identify the call as a possibly obfuscated call.

Stages 402 to 418 are repeated for each call instruction emulated. For example, the stages 402 to 418 would be repeated if the emulator 220 emulates call instructions to modules B (address 244) and C (address 252), or some other set of unique calls.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

As used herein, the term execute can be the execution of a compiled instruction or the emulation of an instruction in a controlled environment.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method, comprising:
identifying a number of call instructions in a binary executable;
for each of the number of call instructions:
executing the call instruction, wherein executing the call instruction causes a return address after the call instruction to be stored in a call stack;
sequentially executing a plurality of instructions subsequent to a target of the call instruction;
determining that an address identified by a stack pointer of the call stack is different from the return address;
in response to the determination that the address identified by the stack pointer is different from the return address, determining if there is a non-obfuscation signal present;
if there is a non-obfuscation signal present, identifying the call instruction as a non-obfuscated call instruction;
if there is not a non-obfuscation signal present, identifying the call instruction as a possibly obfuscated call instruction;
determining whether the call instructions identified as possibly obfuscated call instructions exceeds a threshold number;
in response to the determination that the call instructions identified as possibly obfuscated call instructions exceeds the threshold number, identifying the binary executable as an obfuscated executable; and
in response to the determination that the call instructions identified as possibly obfuscated call instructions do not exceed the threshold number, identifying the binary executable as a non-obfuscated executable.

2. The method of claim 1, wherein identifying a number of call instructions in a binary executable comprises identifying call instructions in the binary executable, wherein for each of the identified call instructions a target of the call instruction has an offset that is unique from offsets of targets of any of the other identified call instructions, and wherein the offset of a target of the call instruction is a position of the target of the call in the binary executable relative to a memory space addressed at a beginning address of the binary executable.

3. The method of claim 1, wherein determining if there is a non-obfuscation signal present comprises:
determining whether the call instruction executed; and
if the call instruction did not execute, then identifying the call instruction as a non-obfuscated call instruction.

4. The method of claim 1, wherein determining if there is a non-obfuscation signal present comprises:
determining whether an instruction pointer points to the call instruction; and
if the instruction pointer points to the call instruction, then identifying the call instruction as a non-obfuscated call instruction.

5. The method of claim 4, further comprising:
if the instruction pointer does not point to the call instruction, determining whether the instruction pointer points to a next instruction after the call instruction;
if the instruction pointer points to the next instruction after the call instruction, identifying the call instruction as a non-obfuscated call instruction; and
if the instruction pointer does not point to the next instruction after the call instruction, identifying the call instruction as a possibly obfuscated call instruction.

6. The method of claim 1, wherein determining if there is a non-obfuscation signal present comprises:
determining whether an instruction pointer points to a next instruction after the call instruction;
if the instruction pointer points to the next instruction after the call instruction, identifying the call instruction as a non-obfuscated call instruction; and
if the instruction pointer does not point to the next instruction after the call instruction, identifying the call instruction as a possibly obfuscated call instruction.

7. The method of claim 1, further comprising:
identifying in the plurality of instructions subsequent to a target of the call instruction a subsequent call instruction; and
converting each subsequent call instruction to a non-operational instruction.

8. The method of claim 7, wherein identifying a subsequent call instruction comprises identifying subsequent call instructions only within a control range of the target, the control range being a predetermined range of bytes within the target.

9. The method of claim 8 further comprising:
determining whether any of the plurality of instructions reference a location outside the control range from the target of the call instruction;
if the location is not outside the control range, processing the plurality of instructions; and
if the location is outside the control range, identifying the call instruction as a non-obfuscated call instruction.

10. A system, comprising:
one or more computers; and;
a computer-readable medium coupled to the one or more computers having instructions stored thereon which, when executed by the one or more computers, cause the one or more computers to perform operations comprising:
identifying a number of call instructions in a binary executable;
for each of the number of call instructions:
executing the call instruction, wherein executing the call instruction causes a return address after the call instruction to be stored in a call stack;
sequentially executing a plurality of instructions subsequent to a target of the call instruction;
determining that an address identified by a stack pointer of the call stack is different from the return address;
in response to the determination that the address identified by the stack pointer is different from the return address, determining if there is a non-obfuscation signal present;
if there is a non-obfuscation signal present, identifying the call instruction as a non-obfuscated call instruction;
if there is not a non-obfuscation signal present, identifying the call instruction as a possibly obfuscated call instruction;
determining whether the call instructions identified as possibly obfuscated call instructions exceeds a threshold number;
in response to the determination that the call instructions identified as possibly obfuscated call instructions exceeds the threshold number, identifying the binary executable as an obfuscated executable; and in response to the determination that the call instructions identified as possibly obfuscated call instructions do not exceed the threshold number, identifying the binary executable as a non-obfuscated executable.

11. The system of claim 10, wherein identifying a number of call instructions in a binary executable comprises identifying call instructions in the binary executable wherein for each of the identified called instructions a target of the call instruction has an offset that is unique from offsets of targets of any of the other identified call instructions, and wherein the offset of a target of the call instruction is a position of the target of the call in the binary executable relative to a memory space addressed at a beginning address of the binary executable.

12. The system of claim 10, wherein determining if there is a non-obfuscation signal present comprises:

determining whether an instruction pointer points to the call instruction; and if the instruction pointer points to the call instruction, then identifying the call instruction as a non-obfuscated call instruction.

13. The system of claim 12, further comprising:

if the instruction pointer does not point to the call instruction, determining whether the instruction pointer points to a next instruction after the call instruction;

if the instruction pointer points to the next instruction after the call instruction, identifying the call instruction as a non-obfuscated call instruction; and if the instruction pointer does not point to the next instruction after the call instruction, identifying the call instruction as a possibly obfuscated call instruction.

14. The system of claim 10, wherein determining if there is a non-obfuscation signal present comprises:

determining whether an instruction pointer points to a next instruction after the call instruction;

if the instruction pointer points to the next instruction after the call instruction, identifying the call instruction as a non-obfuscated call instruction; and if the instruction pointer does not point to the next instruction after the call instruction, identifying the call instruction as a possibly obfuscated call instruction.

15. The system of claim 10, further comprising:

identifying in the plurality of instructions subsequent to a target of the call instruction a subsequent call instruction; and converting each subsequent call instruction to a non-operational instruction.

16. The system of claim 15, wherein identifying a subsequent call instruction comprising identifying subsequent call instructions only within a control range of the target, the control range being a predetermined range of bytes within the target.

17. The system of claim 16 further comprising:

determining whether any of the plurality of instructions reference a location outside the control range from the target of the call instruction;

if the location is not outside the control range, processing the plurality of instructions; and if the location is outside the control range, identifying the call instruction as a non-obfuscated call instruction.

18. A computer program product, encoded on one or more memory storage devices, including instructions that when executed by one or more data processing apparatuses cause the one or more data processing apparatuses to perform operations comprising:

identifying a number of call instructions in a binary executable;

for each of the number of call instructions:

executing the call instruction, wherein executing the call instruction causes a return address after the call instruction to be stored in a call stack;

sequentially executing a plurality of instructions subsequent to a target of the call instruction;

determining that an address identified by a stack pointer of the call stack is different from the return address;

in response to the determination that the address identified by the stack pointer is different from the return address, determining if there is a non-obfuscation signal present;

if there is a non-obfuscation signal present, identifying the call instruction as a non-obfuscated call instruction;

if there is not a non-obfuscation signal present, identifying the call instruction as a possibly obfuscated call instruction;

determining whether the call instructions identified as possibly obfuscated call instructions exceeds a threshold number;

in response to the determination that the call instructions identified as possibly obfuscated call instructions exceeds the threshold number, identifying the binary executable as an obfuscated executable; and in response to the determination that the call instructions identified as possibly obfuscated call instructions do not exceed the threshold number, identifying the binary executable as a non-obfuscated executable.

19. The computer program product of claim 18, wherein identifying a number of call instructions in a binary executable comprises identifying call instructions in the binary executable, wherein for each of the identified call instructions a target of the call instruction has an offset that is unique from offsets of targets of any of the other identified call instructions, and wherein the offset of a target of the call instruction is a position of the target of the call in the binary executable relative to a memory space addressed at a beginning address of the binary executable.

20. The computer program product of claim 18, wherein determining if there is a non-obfuscation signal present comprises:

determining whether the call instruction executed; and if the call instruction did not execute, then identifying the call instruction as a non-obfuscated call instruction.

* * * * *